United States Patent [19]
Lauritzen et al.

[11] Patent Number: 5,887,160
[45] Date of Patent: Mar. 23, 1999

[54] METHOD AND APPARATUS FOR COMMUNICATING INTEGER AND FLOATING POINT DATA OVER A SHARED DATA PATH IN A SINGLE INSTRUCTION PIPELINE PROCESSOR

[75] Inventors: Mogens Lauritzen, Los Altos; Richard A. Weiss, Los Altos Hills, both of Calif.

[73] Assignee: Fujitsu Limited, Kawasaki, Japan

[21] Appl. No.: 767,953

[22] Filed: Dec. 17, 1996

Related U.S. Application Data

[60] Provisional application No. 60/032,374, Dec. 10, 1996.
[51] Int. Cl.⁶ .................................................. G06F 9/38
[52] U.S. Cl. .................... 395/563; 364/748.01; 395/562; 395/306; 395/800.41
[58] Field of Search ................ 364/748.01; 395/306, 395/307, 562, 563, 800.41, 800.34

[56] References Cited

U.S. PATENT DOCUMENTS

| | | | |
|---|---|---|---|
| 4,228,496 | 10/1980 | Katzman et al. | 395/308 |
| 4,851,990 | 7/1989 | Johnson et al. | 395/280 |
| 4,901,267 | 2/1990 | Birman et al. | 364/748.19 |
| 5,083,263 | 1/1992 | Joy et al. | 395/800.41 |
| 5,109,495 | 4/1992 | Fite et al. | 395/383 |
| 5,109,514 | 4/1992 | Garner et al. | 395/733 |
| 5,134,693 | 7/1992 | Saini | 395/591 |
| 5,159,680 | 10/1992 | Joy et al. | 395/800.41 |
| 5,179,680 | 1/1993 | Colwell et al. | 711/125 |
| 5,193,175 | 3/1993 | Cutts, Jr. et al. | 395/182.09 |
| 5,204,828 | 4/1993 | Kohn | 364/748.07 |
| 5,210,841 | 5/1993 | Johnson | 711/3 |
| 5,222,240 | 6/1993 | Patel | 395/394 |
| 5,226,166 | 7/1993 | Ishida et al. | 395/800.23 |
| 5,265,213 | 11/1993 | Weiser et al. | 395/587 |
| 5,293,500 | 3/1994 | Ishida et al. | 395/393 |
| 5,333,281 | 7/1994 | Nishikawa et al. | 395/394 |
| 5,481,751 | 1/1996 | Alpert et al. | 395/389 |
| 5,664,136 | 9/1997 | Witt et al. | 395/384 |

OTHER PUBLICATIONS

"MIPS R4200", Microprocessor Report, May 1993, pp. 6–7.
"R4200 Microprocessor", R4200 Preliminary Data Sheet, Rev. 1.4, MIPS Computers, Inc., Aug. 1994, pp. 1–37.
The SPARC Architecture Manual, Version 8, SPARC International, Inc., 1992, pp. 1–7, 9–15, 17–21 and 23–41.
Computer Architecture and Organization, Third Edition, John P. Hayes, pp. 275–284.

*Primary Examiner*—Kenneth S. Kim
*Attorney, Agent, or Firm*—Christie, Parker & Hale, LLP

[57] ABSTRACT

A microprocessor synchronously executes instructions, the instructions including integer instructions for performing integer operations and floating point instructions for performing real number operations. An instruction pipeline has a plurality of successive stages for synchronously executing each of the instructions in parallel, with integer and floating point instructions being intermixed in the pipeline. Each of the plurality of successive stages simultaneously operates on a different one of the instructions. An integer unit executes the integer instructions and forms an integer result based on an integer operation performed on at least one integer operand or integer result. A floating point unit executes the floating point instructions and forms a floating point result based on one such floating point operation performed on at least one floating point operand or floating point result. A data path is shared by the integer unit and the floating point unit for communicating between the plurality of successive stages in the instruction pipeline integer operands or the integer results and the floating point operands or the floating point results.

34 Claims, 5 Drawing Sheets

METHOD AND APPARATUS FOR COMMUNICATING INTEGER AND FLOATING POINT DATA OVER A SHARED DATA PATH IN A SINGLE INSTRUCTION PIPELINE PROCESSOR

CROSS REFERENCE TO RELATED APPLICATION

This claims priority of provisional patent Application No. 60/032,374, entitled "Method and Apparatus for Communicating Integer and Floating Point Data Over a Shared Data Path in a Microprocessor," pending, filed Dec. 10, 1996.

1. Field of the Invention

The present invention relates generally to microprocessors and methods for transferring integer and floating point data over a shared data path and, in particular, to a microprocessor having a shared data path and for communicating integer and floating point data to an integrated integer unit and a floating point unit, respectively, and having a plurality of pipeline stages.

2. Background of the Invention

Separately processing integer and real number instructions typically decreases processing throughput as measured in the number of program instructions executed per cycle. This is due in part to the increased complexity and precision required in processing real numbers as opposed to integers. Moreover, real numbers and integers are represented by different forms of internal machine notation. Floating point notation is used for representing real numbers and typically includes a sign bit, exponent and fraction, although other formats are possible. Two's complement notation and one's complement notation are used for representing integers and typically include a sign bit and magnitude, although other formats are possible. These distinct notations introduce an added layer of complexity to efficient microprocessor design.

A typical central processing unit (CPU) of a microprocessor includes an arithmetic logic unit (ALU) (also referred to as an integer unit (IU)), for performing integer instructions and a set of general purpose registers, although specialized hardware is sometimes used for performing integer multiplication and division. Simple integer arithmetic instructions, such as addition or subtraction, are typically completed in a single machine cycle.

Despite the difference in internal notation, the IU can also be used for performing floating point instructions, such as disclosed in *MIPS R4200, Microprocessor Report*, May 1993, pp. 6–7, and *R4200 MICROPROCESSOR, R4200 Preliminary Datasheet Rev.* 1.4, MIPS Computers, Inc., August 1994, pp. 1–37. No conversion between floating point and integer representations is necessary, but since the processing of floating point operations is longer than IU operations, performance will be lower.

A dedicated floating point unit (FPU) can optionally be employed for performing floating point instructions in parallel with integer instructions, such as disclosed in U.S. Pat. No. 5,179,680 to Colwell et al., U.S. Pat. No. 5,226,166 to Ishida et al. and U.S. Pat. No. 5,293,500 to Ishida et al. However, this type of FPU requires a separate data path for communicating floating point operands and results between the IU and the FPU. In addition, processing of the FPU's instruction must be synchronized to processing of the IU's instruction thereby adding further operational complexity and delay.

SUMMARY OF THE INVENTION

According to an embodiment of the present invention disadvantages of the prior art are overcome by providing a microprocessor and method for communicating integer and floating point data over a shared data path system.

An embodiment of the present invention is a microprocessor for synchronously executing instructions. The instructions include integer instructions for performing integer operations and floating point instructions for performing real number operations. An instruction pipeline has successive stages for synchronously processing a plurality of instructions. Each of the plurality of successive stages simultaneously operates on a different one of the instructions. In the present invention, integer instructions and floating point instructions may be intermixed in the pipeline. An integer unit executes the integer instructions and for each of the integer instructions forms an integer result. A floating point unit executes the floating point instructions and for each of the floating point instructions forms a floating point result. A data path is shared by the integer unit and the floating point unit for communicating data between the plurality of successive stages in the instruction pipeline.

Another embodiment of the present invention is a microprocessor for pipelined processing of program instructions. Each of the program instructions comprises either an integer program instruction or a floating point program instruction. Circuitry is provided for simultaneously processing a plurality of the program instructions, for executing an integer instruction to form an integer result from at least one integer operand, for executing a floating point instruction to form a floating point result from at least one floating point operand, for communicating to the integer unit the integer result and the at least one integer operand, and for communicating the floating point result and the at least one floating point operand to the floating point unit.

A further embodiment of the present invention is a method for communicating integer values and floating point values to an integer unit and a floating point unit, respectively, over a shared data path in a microprocessor. Each of the integer values comprises at least one of an integer operand or an integer result. Each of the floating point values comprises at least one of a floating point operand or a floating point result. The steps include providing an instruction to the microprocessor. The instruction is either an integer instruction or a floating point instruction. The instruction is issued for execution to either an integer unit or a floating point unit, depending on its type. Generally, if the issued instruction is an integer instruction, it is executed using the integer unit to form an integer result. However, if the issued instruction is an integer multiply, it is executed by a floating point multiply unit, and if the issued instruction is an integer divide, it is executed by a floating point divide unit. If the issued instruction is a floating point instruction, it is executed using the floating point unit to form a floating point result. The integer result or the floating point result is communicated over the shared data path.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

DETAILED DESCRIPTION

I. Microprocessor

Figure 1:
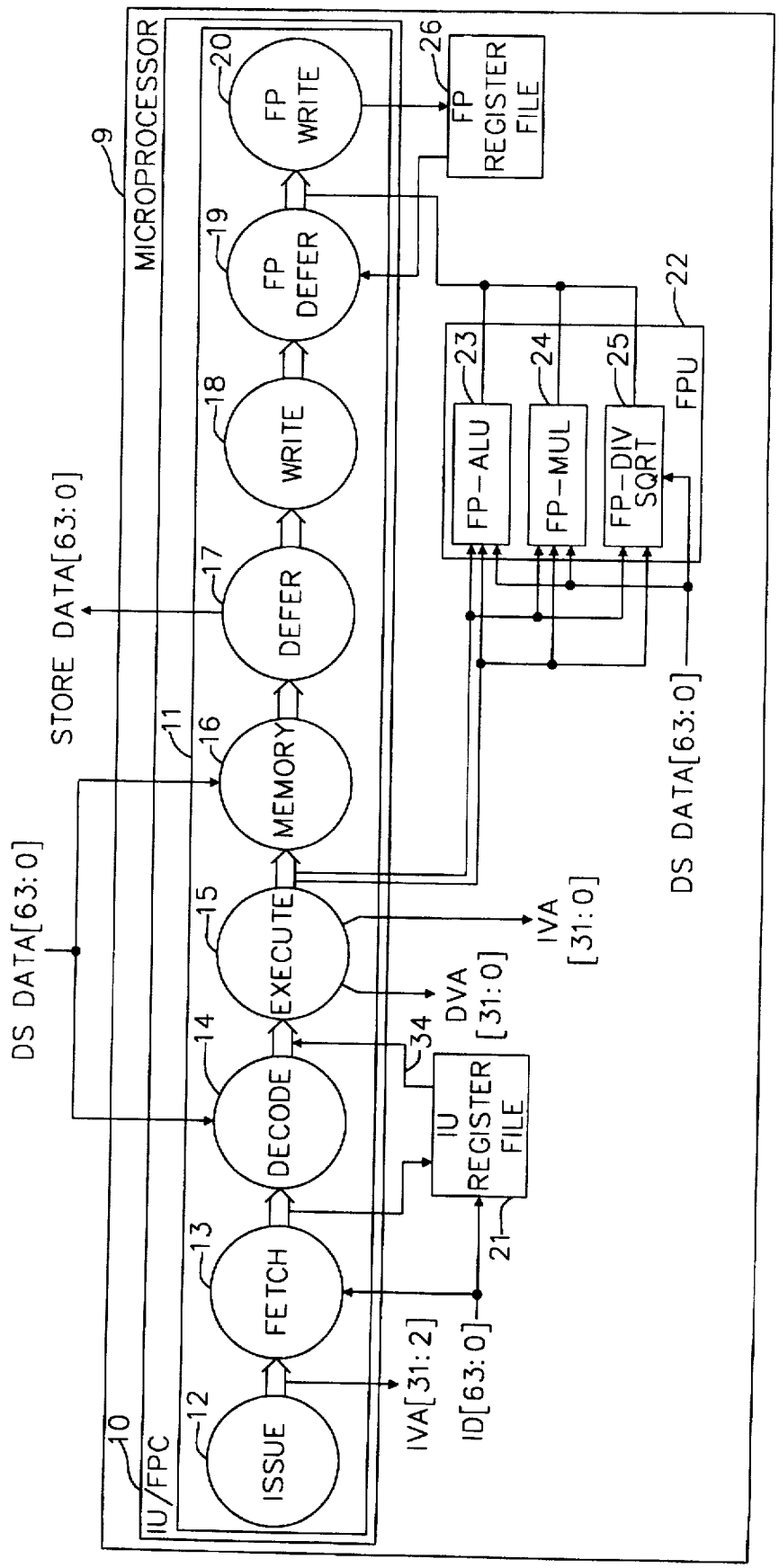
FIG. 1 is a functional block diagram of a microprocessor incorporating the shared data path of the present invention.

FIG. 1, is a functional block diagram of a microprocessor 9 incorporating the shared data path of the present invention. Microprocessor 9 includes a combined integer unit/floating point controller (IU/FPC) 10 and a separate floating point unit (FPU) 22). Preferably, microprocessor 9 is a single instruction issue processor utilizing a Reduced Instruction Set Computer (RISC) design conforming to the SPARC® architecture specification and having a logical instruction pipeline 11 which enables the microprocessor 9 to concurrently process multiple program instructions. "SPARC®" is a registered trademark of SPARC International, Inc., Menlo Park, Calif. General information regarding the SPARC® RISC architecture specification can be found in *The SPARC Architecture Manual*, Version 8, SPARC International, Inc., 1992, the disclosure of which is incorporated herein by reference. A new program instruction is received into instruction pipeline 11 during each machine cycle and proceeds from one stage to the next with each successive cycle until processing is complete. Consequently, processing of each program instruction overlaps in time with the other program instructions already in the instruction pipeline, thereby resulting in increased processing throughput.

The RISC design generally limits the available program instructions to load and store instructions for accessing memory, and arithmetic and logical instructions. For microprocessor 9, program instruction formats are aligned on 32-bit memory boundaries and employ a uniform placement of operational code (opcode) and register address fields. Moreover, microprocessor 9 implements a Harvard (Aiken) memory architecture for partitioning instructions and program data into an instruction cache (not shown) for storing program instructions and a data cache for storing program data (not shown).

Figure 2:
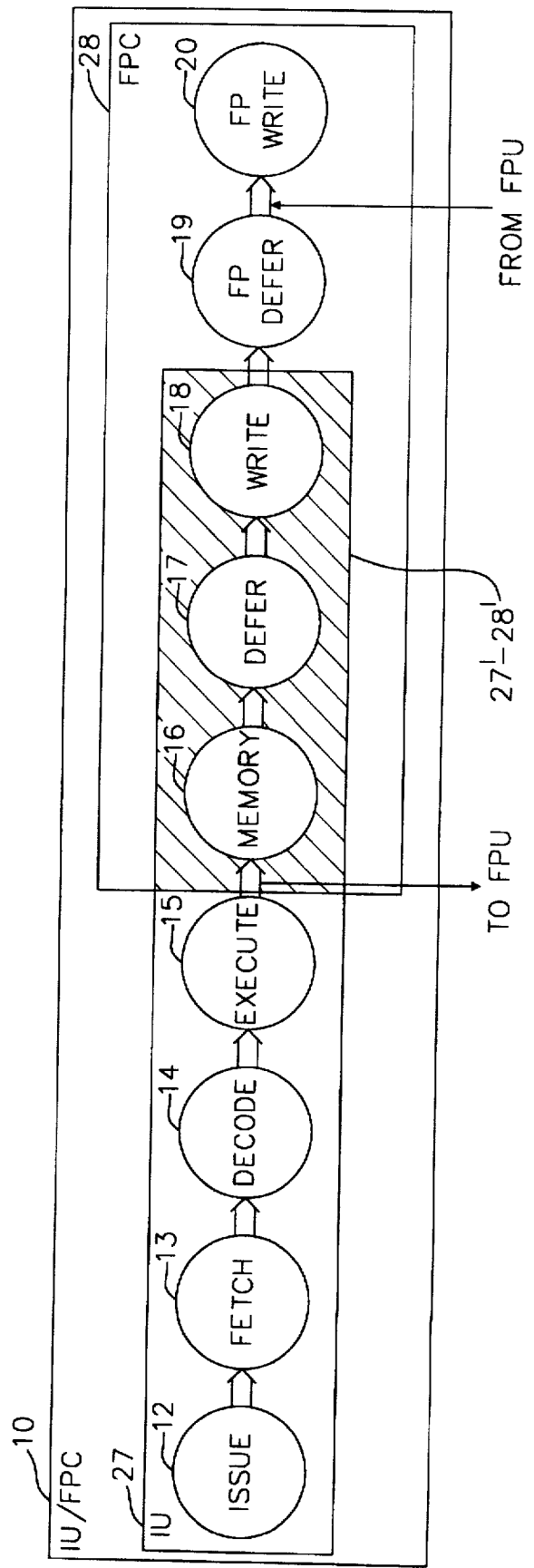
FIG. 2 is a block diagram of the instruction pipeline.

Referring now to FIGS. 1 and 2, integer and floating point instructions are respectively processed by separate functional units integrated within microprocessor 9: integer unit (IU) 27, integrated within IU/FPC 10, for processing integer instructions, and FPU 22 for processing floating point instructions. FPU 22 executes floating point instructions as a separate functional unit from IU/FPC 10, although a floating point controller (FPC) 28, also integrated within IU/FPC 10, controls the dispatch, synchronization and completion of floating point instructions between IU/FPC 10 and FPU 22. IU 27 contains general purpose registers (not shown) for executing integer instructions and controls the overall operation of the microprocessor 9 by computing load and store memory addresses and by maintaining a program counter (PC)(not shown). As shown in FIG. 2, IU 27 includes the first seven logical stages ISSUE 12, FETCH 13, DECODE 14, EXECUTE 15, MEMORY 16, DEFER 17, and WRITE 18, of logical instruction pipeline 11 and FPC 28 includes the last five logical stages MEMORY 16, DEFER 17, WRITE 18, FP DEFER 19, and FP WRITE 20 of instruction pipeline 28. Note that the logical stages of MEMORY 16, DEFER 17, and WRITE 18 (denoted 27'–28' in FIG. 2) are part of both IU 27 and FPC 28 processing.

FPU 22 consists of three independent subunits. Floating point arithmetic logic unit (FP-ALU) 23 performs floating point addition, subtraction, comparison and conversion instructions. Floating point multiplier (FP-MUL) 24 performs floating point multiplication. Floating point division/square root unit (FP-DIV/SQRT) 25 performs floating point division and square root calculations. In the described embodiment, FP-ALU 23 and FP-MUL 24 produce a floating point result in approximately 3.5 machine cycles regardless of operand type and FP-DIV/SQRT 25 produces a floating point result in approximately 25 machine cycles.

II. Instruction Pipeline

Nine-stage logical instruction pipeline 11 is integrated within IU/FPC 10 for simultaneously processing multiple program instructions. Instruction pipeline 11 enables parallel processing of integer and floating point instructions in a synchronized manner to increase processing throughput. Operand, result and bypass data paths enable microprocessor 9 to complete approximately one instruction per cycle regardless of operand type, because data values can be forwarded without incurring holds or delays. In addition, each integer and floating point instruction requires at least one operand as input, may compute intermediate values and generates a result as output. These values can all be forwarded along an operand, result or bypass data path depending on the particular pipeline stage. The stages of instruction pipeline 11 are as follows:

(1) Issue (ISSUE) stage 12: This stage issues a program instruction by receiving an instruction virtual address IVA [31:2] from either the DECODE stage 14 or EXECUTE stage 15 via the program counter (PC) (not shown) and transmitting IVA[31:2] to the instruction cache (not shown).

(2) Fetch (FETCH) stage 13: This stage fetches a program instruction by performing a program instruction lookup and by receiving a pair of 32-bit program instructions ID[63:0] from the instruction cache (not shown) into a prefetch buffer (not shown). This avoids a one-cycle penalty for branch program instructions.

(3) Decode (DECODE) stage 14: This stage decodes a single program instruction to produce a pair of integer operands by receiving a program instruction from the FETCH stage 13 and producing two integer operands % rs1 and % rs2. These operands are read from either IU Register File 21 or forwarded from the EXECUTE stage 15, MEMORY stage 16, DEFER stage 17 or WRITE stage 18. IU Register File 21 is used for temporarily storing integer operands.

(4) Execute (EXECUTE) stage 15: This stage executes a program instruction and performs integer computations. EXECUTE stage 15 contains an IU arithmetic logic unit (IU-ALU) (not shown) and a 32-bit left and right shifter (not shown). The shifter and IU-ALU execute integer arithmetic instructions, but floating point multiplier 24 performs integer multiplication. Specifically, IU-ALU performs addition and Boolean AND, OR and exclusive OR (XOR) instructions. The instruction virtual address IVA[31:0] is dispatched to the PC (not shown) and the data virtual address DVA[31:0] is dispatched to the data cache (not shown). EXECUTE stage 15 also issues all floating point instructions to floating point unit (FPU) 22, as further described hereinbelow.

(5) Memory (MEMORY) stage 16: This stage stores the results from program instruction execution, or performs IU LOAD instructions, IU STORE instructions, FPU LOAD instructions, or FPU STORE instructions, by receiving and sending 64-bits of data between the instruction pipeline 11, FPU 22 and the data cache (not shown). During LOAD instructions, cache tags are checked for cache hits or misses. During STORE instructions, all data is aligned by store aligner and posted to a store-data-holding register (not shown) for writing out to the data cache when a vacancy appears.

(6) Defer (DEFER) stage 17: This stage assists instruction execution synchronicity by providing an opportunity to cancel WRITE data being sent to IU Register File 21 as a result of a faulted LOAD instruction.

(7) Write (WRITE) stage 18: This stage writes out integer results by receiving integer results from DEFER stage 17 and writing them to IU Register File 21. In addition, floating point division and square root instructions are posted to a special floating point divide or square root holding slot (not shown).

(8) Floating point defer (FP-DEFER) stage 19: This stage synchronizes the completion of all floating point instructions, including arithmetic, and multiplication operations. In addition, any posted floating point division and square root instructions are also completed. Arithmetic, logical and multiplication instructions complete in four cycles in synchronicity with instruction pipeline 11, while division and square root instructions complete in approximately 25 cycles.

(9) Floating point write (FP-WRITE) stage 20: This stage writes out floating point results. Any floating point WRITE instruction posted to FP register file 26 is written or any faulting floating point instructions are inserted into a floating point fault queue. The floating point status register is also updated.

To achieve synchronicity between the execution of integer and floating point instructions and to increase instruction processing throughput, microprocessor 9 employs a shared data path for communicating integer and floating point data between IU/FPC 10 and FPU 22. Both IU 27 and FPU 22 require data paths, including bypass paths, for forwarding operands and results between registers in various stages of instruction pipeline 11. As further described hereinbelow, specific sections of these data paths are shared between MEMORY stage 16 through WRITE stage 18.

Floating point instructions are processed in DECODE stage 14 through FP-WRITE stage 20 as follows. All floating point instructions are tested for structural and operand hazards in DECODE stage 14. Floating point instruction operands are gathered from a FP register file in EXECUTE stage 15. Floating point controller (FPC) 28 operates during DEFER stage 17 through FP-WRITE stage 20 and controls the operation of FPU 22 by coordinating the dispatch of floating point instructions and operands to FPU 22 and the receipt of floating point results from FPU 22. Floating point instructions are executed by FPU 22 beginning in MEMORY stage 16 and complete approximately 3.5 cycles later in FP-DEFER stage 19, except for floating point division and square root instructions which complete in approximately 25 cycles. Floating point results are written to FP register file in FP-WRITE stage 20. Either the FP register file or a three-entry floating point fault queue is written during FP WRITE stage 20, along with the floating point status register (FSR).

FPC 28 issues one floating point instruction per cycle. All floating point copy and load instructions complete in MEMORY stage 16, but the floating point result is pipelined through instruction pipeline 11 using the shared data path, as further described hereinbelow, to FP-DEFER stage 19. Floating point instructions for FP-ALU 23 and FP-MUL 24 complete in FP-DEFER stage 19, regardless of abnormal or normal operands or results, whereas floating point instructions for FP-DIV/SQRT 25 are pipelined during the MEMORY stage 16, DEFER stage 17 and WRITE stage 18. Thereafter, these instructions enter an FP-DIV/SQRT holding slot (not shown).

As described hereinabove, floating point operands are gathered during EXECUTE stage 15 and floating point instruction execution begins during MEMORY stage 16. Since FPU 22 can operate on either 32-bit (single word) or 64-bit (double word) values, the data paths within FPU 22 are 64-bits wide. Single word operands are aligned on the operand and bypass data paths according to register number. Specifically, a single word being sent to floating point register % f0 (not shown) uses bits [63:32] while a single word being read from floating point register % f25 (not shown) uses bits [31:0]. The bypass data path for floating point operand 2 (bits [63:32]) is separate from the bypass data path for floating point operand 1 (bits [31:0]) since two different 32-bit values could be combined to form one 64-bit operand, or a single 64-bit value could be used as two separate 32-bit operands. Since data for both integer and floating point STORE instructions is gathered in EXECUTE stage 15, IU 27 and FPU 22 can share the 32-bit bypass data path for operand 2 [31:0], as further described hereinbelow in FIG. 3.

III. Shared Operand Data Path

As described hereinabove, integer instructions typically complete in one cycle during EXECUTE stage 15. However, the results are not stored until three stages later in WRITE stage 18. Floating point instructions typically complete in 3.5 cycles, beginning in MEMORY stage 16 and ending in FP-DEFER stage 19. Consequently, integer and floating point instruction processing overlap (as shown in FIG. 2) during three stages: MEMORY stage 16, DEFER stage 17 and WRITE stage 18.

Figure 3:
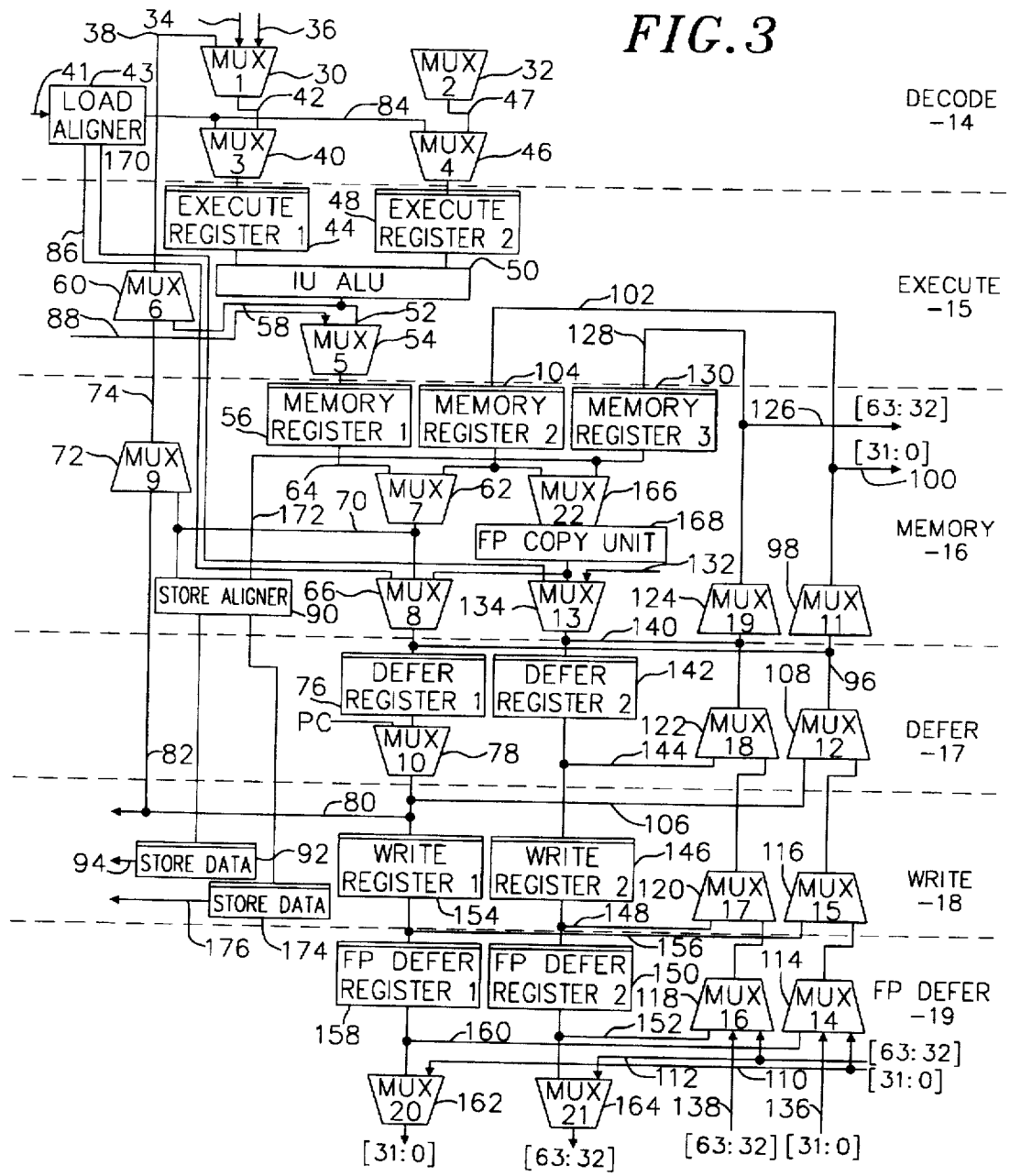
FIG. 3 is a diagram of the shared data path.

FIG. 3 is a diagram of the shared data path for IU 27 and FPU 22. Write decode stage 14, execute stage 15, memory stage 16, defer stage 17, write stage 18 and floating point defer stage 19, having overlapping data paths as depicted by hi-lighted paths 201 through 209 in FIGS. 3A and 3B.

There are nine separate but overlapping data paths used by the instruction pipeline through the circuitry shown in FIG. 3. All lines shown are 32 bits wide. Five data paths 201–205 are used for processing integer instructions and four paths 206–209 are used for processing floating point instructions. In the preferred embodiment of this invention, data present in the circuitry at each stage of the instruction pipeline may be either integer data or floating point data.

A. Data Path For Integer Arithmetic and Logic Instructions

Figure 3A:
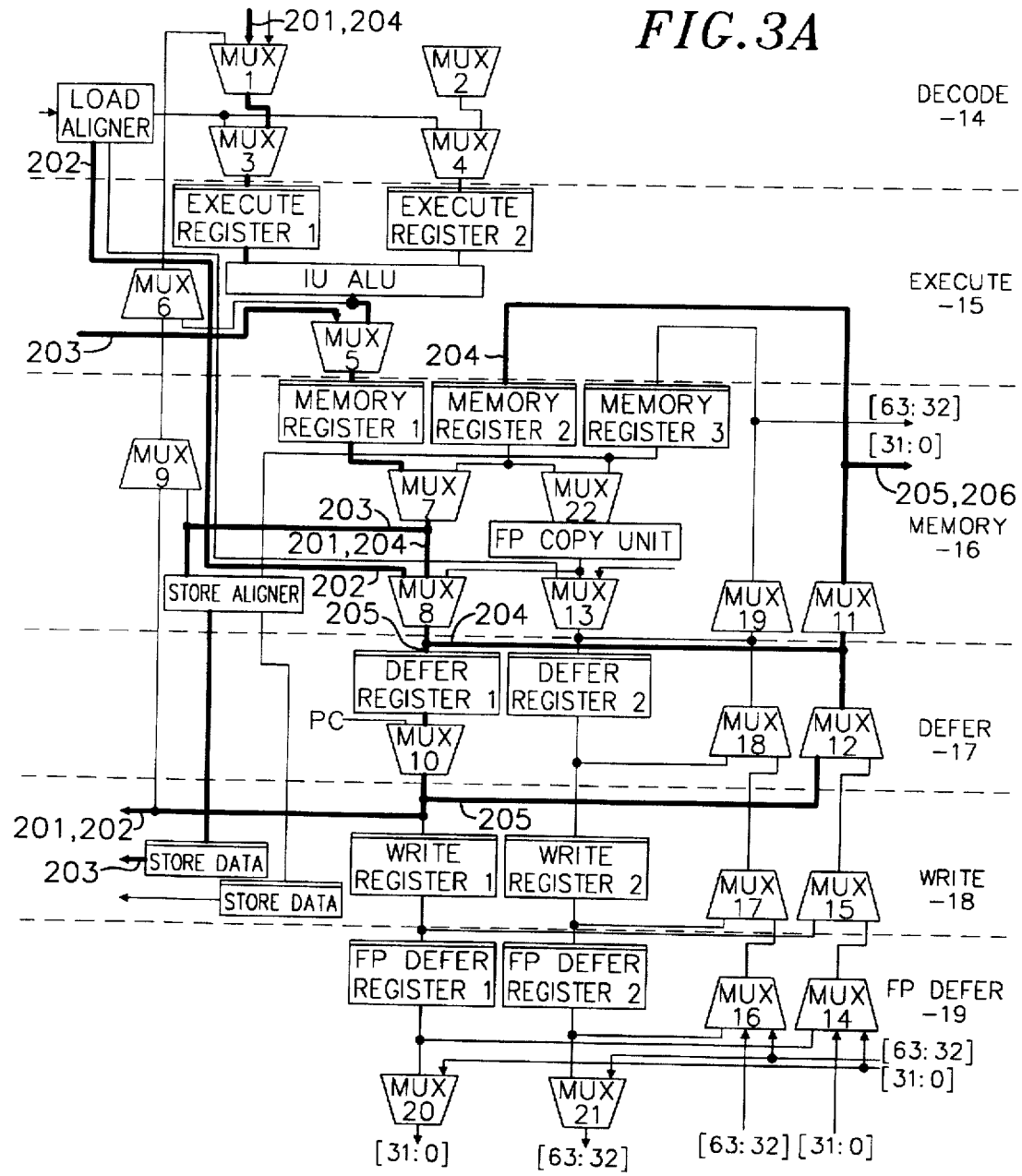
FIG. 3A is a copy of FIG. 3, with reference numerals removed for better visualization, which hi-lights five data paths (201–205) used for processing integer operands and results that overlap with paths used for processing floating point operands and results.

Referring to the hi-lighted data path 201 of FIG. 3A, Multiplexor (MUX) 1 30 selects the input data for integer operand 1. MUX 2 32 selects the input data for integer operand 2. The input paths are similar for each operand, however, the input paths for MUX 2 32 and associated bypass circuitry (described below) have been omitted from FIG. 3 for reasons of clarity and will not be discussed herein. The input data includes data from a bypass path and from two operand fields of the instruction being executed.

During DECODE stage 14, inputs to MUX 1 30 include a 32-bit value from the IU Register File 21 over Line 34, an immediate or zero operand on Line 36 as specified by selected fields of the integer instruction being processed, or a bypass integer operand on Line 38 containing a recently generated integer result. The bypass circuitry will be described below in further detail. Control lines (not shown) select which input to MUX 1 30 is forwarded to MUX 3 40 over Line 42. MUX 3 40 takes as input either the output of MUX 1 30 or data from the data cache (not shown). The data from the data cache arrives over Line 41 and is processed by Load Aligner 43. The Load Aligner 43 aligns the data from the data cache on selected word and byte boundaries required by the IU ALU 50 and forwards the data to MUX 3 40 over Line 84. MUX 3 40 forwards the selected integer operand 1 and the operand is stored in Execute Register 1 44. Similarly, MUX 2 32 selects an integer operand 2 for forwarding through MUX 4 46 over Line 48 to Execute Register 2 48.

During EXECUTE stage 15, the integer operands are fetched from Execute Register 1 44 and Execute Register 2 48 and the Integer Unit Arithmetic Logic Unit (IU ALU) 50 performs the arithmetic or logical operation on the two integer operands. The integer result of the operation is always forwarded over Line 52 to MUX 5 54 and stored in Memory Register 1 56, but may also be sent on the integer operand 1 bypass path via Line 58. The integer operand 1 bypass path includes the output of the IU ALU 50 on Line 58 to MUX 6 60. If the instruction being processed during the DECODE stage 14 requires an operand from the IU Register File 21 that was just updated in the EXECUTE stage 15 but not yet written back to the IU Register File 21, this operand is forwarded back to the DECODE stage circuitry just described. This path is shown as Line 38 connecting MUX 6 60 and MUX 1 42.

During MEMORY stage 16, the integer result is transferred from Memory Register 1 56 to MUX 7 62 over Line 64, and then on to MUX 8 66 over Line 68. If the integer result during the MEMORY stage 16 is required as an integer operand 1, then it is forwarded over the integer operand 1 bypass path by transferring the integer result over Line 70 to MUX 9 72, and then on to MUX 6 60 over Line 74. The integer result is always written into Defer Register 1 76.

During WRITE stage 18, the integer result is transferred from Defer Register 1 76 through MUX 10 78 over Line 80 to the IU Register File 21. If the integer result during WRITE stage 18 is required as an integer operand 1, then it is forwarded over the integer operand 1 bypass path by transferring the integer result over Line 82 to MUX 9 72.

B. Data Path For Load Integer Instructions

When the instruction being processed by the instruction pipeline is a LOAD integer instruction (i.e., a load of a register in the IU Register File 21 with integer data from the data cache), operand generation processing is generally the same as for an arithmetic or logic instruction. However, instead of performing an arithmetic or logic operation, the IU ALU 50 calculates the address of the data to be loaded into a selected register. The address and register information are immediate operands obtained from the instruction over Line 34 and the line for integer operand 2 (not shown).

During DECODE stage 14, the integer operands are determined as explained above. During EXECUTE stage 15, the IU ALU calculates the address in the data cache of the data to be loaded. The address is forwarded to the data cache over a path which is not shown in FIG. 3. During MEMORY stage 16, the Load Aligner 43 accepts data addressed by the address calculated by the IU ALU from the data cache over Line 41 and forwards the data to MUX 8 66 over Line 86. The data is then stored in Defer Register 1 76. During WRITE stage 18, the data is transferred via MUX 10 78 to a selected register in the IU Register File 21 over Line 80.

C. Data Path For Store Integer Instructions

Referring to the hi-lighted data path 203 of FIG. 3A, when the instruction being processed by the instruction pipeline is a STORE integer instruction (i.e., storing integer data from a register in the IU Register File 21 to a memory location in the data cache), operand generation processing is generally the same as for an arithmetic or logic instruction. However, instead of performing an arithmetic or logic operation, the IU ALU 50 calculates the address of the data to be stored into the data cache. The address and register information are immediate operands obtained from the instruction over Line 34 and the line for integer operand 2 (not shown).

During DECODE stage 14, the integer operands are determined as explained above. During EXECUTE stage 15, the IU ALU calculates the address in the data cache of the data to be stored. The data is received from a selected register in the IU Register File 21 over Line 88, transferred by MUX 5 54, and stored into Memory Register 1 56. During MEMORY stage 16, the data is forwarded through MUX 7 62 over Line 64 to Store Aligner 90 over Line 70. Store Aligner 90 performs the inverse operation of Load Aligner 43. It aligns the data according to the requirements of the data cache. The data is then stored in Store Data Register 1 92. During WRITE stage 18, the data is transferred over Line 94 to the specified location in the data cache.

D. Data Path For Integer Store Data Bypass

Referring to the bold lined data path 204 of FIG. 3A, the present invention provides the capability to forward intermediate results of instruction processing in the pipeline back to an earlier stage of the pipeline for immediate use by a subsequent instruction. For example, consider the situation where a value "A" is computed during EXECUTE stage 15. The computed value "A" may be still in the instruction pipeline at a stage subsequent to the EXECUTE stage (and thus, not yet stored in a register in the IU Register File 21) when it may be needed as an operand by an instruction at an earlier stage of the pipeline. If the forwarding capability was not provided, the instruction pipeline would have to be held up until the updated value "A" could be written to the IU Register File and then fetched back into the pipeline, otherwise processing of the instruction requiring "A" would not utilize the latest computed value of "A". The forwarding capability avoids these problems by sending the computed data back into an earlier stage of the instruction pipeline when needed.

Integer data that is to be written to the IU Register File 21 may be forwarded back into the instruction pipeline in two cases. The first case is during the MEMORY stage 16. When the data reaches MUX 8 66, it is forwarded over Line 96 to MUX 11 98. MUX 11 98 controls whether the data should be forwarded over Lines 100 and 102 to Memory Register 2 104. Once the data is in Memory Register 2 104, it may be forwarded via MUX 7 62 to the bypass path discussed above starting on Line 70 to MUX 9 72. The loading of data into Memory Register 2 104 occurs during the same clock cycle as the loading of data into Memory Register 1 56. The second case is during the DEFER stage 17. When the data reaches MUX 10 78, it is forwarded over Line 106 to MUX 12 108. MUX 12 108 controls whether the data should join the bypass path through MUX 11 98 to Memory Register 2 104.

E. Data Path For Integer Multiplication and Division Instructions

Referring to the bold lined data path 205 of FIG. 3A, in the present invention, execution of integer multiplication and division instructions is not done by the IU ALU 50.

Instead, integer operands are forwarded to FP-MUL 24 and FP-DIV SQRT 25 in the FPU 22 in the following manner. During MEMORY stage 16, operand data is forwarded through MUX 8 66 and sent over Line 96 to MUX 11 98. The operand data is then forwarded over Line 100 to the appropriate section of the FPU 22, depending on whether a multiplication or division instruction is being processed. Operand data is also forwarded during DEFER stage 17 from Defer Register 1 76 through MUX 10 78 over Line 106 to MUX 12 108. The operand data is then forwarded over Line 100 to the appropriate section of the FPU 22. The FPU then executes the requested operation. The integer results are sent from the FPU to the IU over Lines 110 and 112. Line 110 carries bits 0–31 of the integer result and Line 112 carries bits 32–63 of the integer result. Bits 0–31 are forwarded through MUX 14 114 and MUX 15 116 to MUX 12 108. From MUX 12 108 the result data is forwarded through MUX 11 98 over Lines 100 and 102 to Memory Register 2 104. The lower 32 bits of the integer result then propagates through MUX 7 62 and may be used in the bypass path starting with Line 70 or may be sent through MUX 8 66, Defer Register 1 76, and MUX 10 78 out to the IU Register File over Line 80. Bits 32–63 of the integer result are forwarded through MUX 16 118, MUX 17 120, MUX 18 122, and MUX 19 124. MUX 19 124 forwards bits 32–63 of the integer result over Lines 126 and 128 to Memory Register 3 130.

A portion of the results of integer multiplication and division operations are also stored in a register called a "Y Register" (not shown in FIG. 3). The Y Register holds the upper 32 bits of a 64 bit result from the integer multiplication or division operation. The Y Register feeds Line 132 to MUX 13 134. The Y Register is fully described in the SPARC Architecture Manual, Version 8, SPARC International, Inc., 1992, and incorporated herein by reference.

F. Data Path for Double Operand Floating Point Instructions

Referring to the bold lined data path 206 of FIG. 3A, double operand floating point (FP) instructions include instructions such as FP addition, FP subtraction, FP multiplication, FP division, FP square root, conversion from integer to floating point and vice versa. The FPU 22 is a separate processing unit in the microprocessor architecture that receives floating point instructions during the EXECUTE stage 15. However, floating point operand generation is accomplished by the circuitry shown in FIG. 3. Only the path for floating point operand 2 is shown. The operand generation path is similar for floating point operand 1.

FP operand 2 data is fetched from the FP Register File 26 during the EXECUTE stage 15. Up to 64 bits of data for floating point operand 2 arrive over Lines 136 and 138, with bits 0–31 of the data arriving on Line 136, and bits 32–63 arriving on Line 138. If FP operand 2 consists of a single 32-bit word, then either bits 0–31 or 32–63 are used, depending on the register number of the register being used. Bits 0–31 are forwarded through MUX 14 114, MUX 15 116, MUX 12 108, MUX 11 98 and over Line 100 to the FPU 22. Alternatively, bits 0–31 of FP operand 2 data may come from the instruction pipeline during the MEMORY 16, DEFER 17, WRITE 18, or FP DEFER 19 stages. This FP operand 2 data is forwarded from MUX 8 66 over Line 96 to the operand generation path during MEMORY stage 16, from Defer Register 1 76 and MUX 10 78 over Line 106 during DEFER stage 17, from Write Register 1 154 over Line 156 during WRITE stage 18, and from FP Defer Register 1 156 over Line 160 during FP DEFER stage 19. Bits 32–63 are forwarded through MUX 16 118, MUX 17 120, MUX 18 122, MUX 19 124 and over Line 126 to the FPU 22. Alternatively, bits 32–63 of FP operand 2 data may come from the instruction pipeline during the MEMORY 16, DEFER 17, WRITE 18, or FP DEFER 19 stages. This FP operand 2 data is forwarded from MUX 13 134 over Line 140 to the operand generation path during MEMORY stage 16, from Defer Register 2 142 over Line 144 during DEFER stage 17, from Write Register 2 146 over Line 148 during WRITE stage 18, and from FP Defer Register 2 150 over Line 152 during FP DEFER stage 19.

Results of processing double operand floating point instructions are returned from the FPU 22 on Lines 110 and 112. Bits 0–31 of the result are received on Line 110, and bits 32–63 are received on Line 112. Bits 0–31 are forwarded to MUX 20 162 and then written to the FP Register File 26. Bits 32–63 are forwarded to MUX 21 164 and then written to the FP Register File 26.

G. Data Path For Single Operand Floating Point Instructions

Figure 3B:
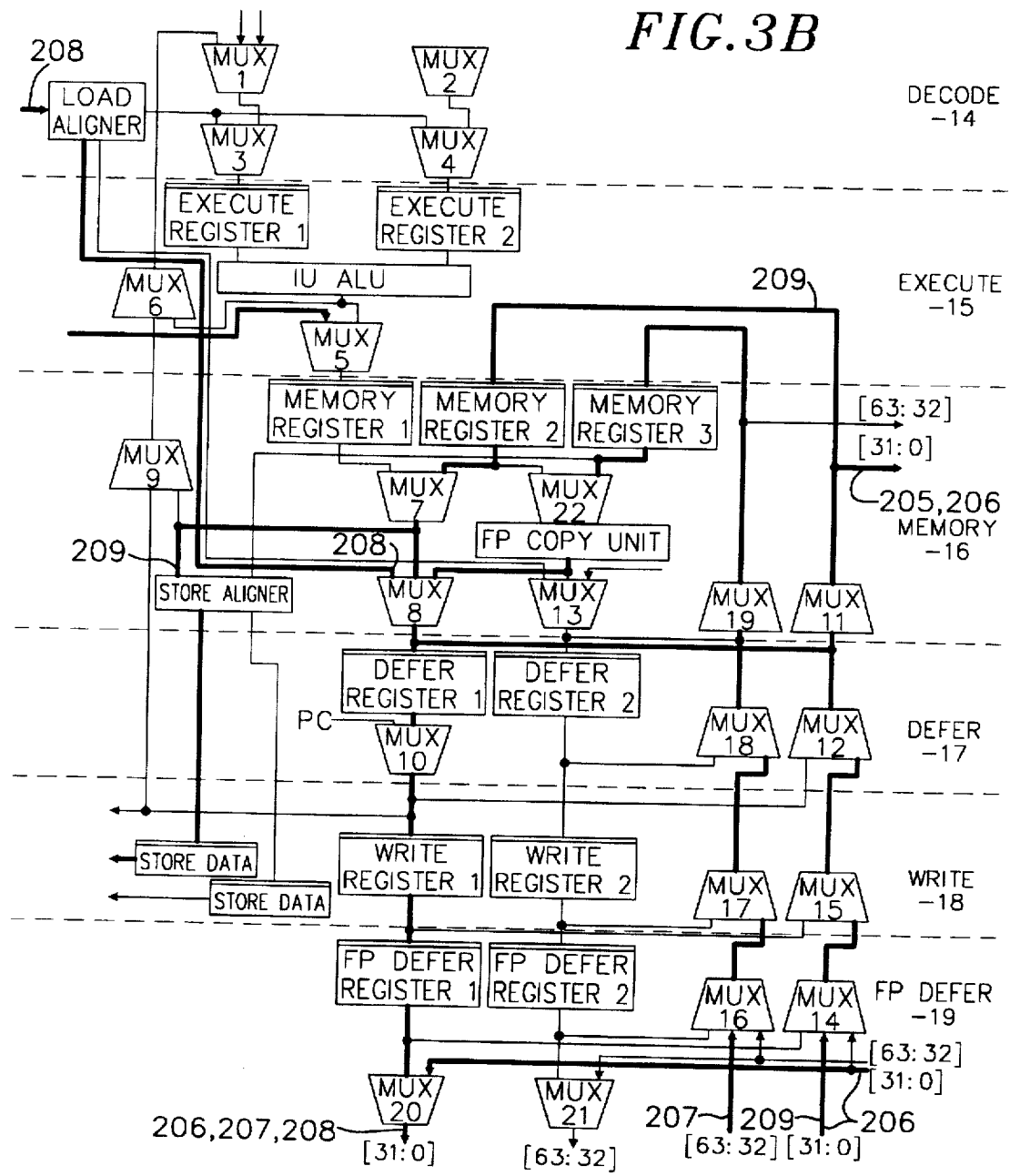
FIG. 3B is a copy of FIG. 3, with reference numerals removed for better visualization, which hi-lights four data paths (206–209) used for processing floating point operands and results that overlap with paths used for processing integer operands and results.

Referring to the bold lined data path 207 of FIG. 3B, single operand floating point instructions include instructions such as FP move (FPMOV), FP negate (FP NEG), FP absolute value (FP ABS), and conversion operations (e.g., integer to floating point double). The FPU 22 is not used for processing these instructions and only FP operand 2 is used as the single operand.

FP operand 2 data is fetched from the FP Register File 26 during EXECUTE stage 15. The 32 bits of data for floating point operand 1 arrive over Lines 136 or 138, with bits 0–31 arriving on Line 136, and bits 32–63 arriving on Line 138. Note that there are two parallel data paths for a 32-bit operand. Data specified as bits 0–31 are forwarded through MUX 14 114, MUX 15 116, MUX 12 108, MUX 11 98 and over Line 100 to Memory Register 2 104. Alternatively, data specified as bits 32–63 are forwarded through MUX 16 118, MUX 17 120, MUX 18 122, MUX 19 124 and over Lines 126 and 128 to Memory Register 3 130. Thus, during the EXECUTE stage 15, 32 bits of data for FP operand 2 are loaded into either Memory Register 2 104 or Memory Register 3 130, but not both. From the memory registers, the data flows through the appropriate data path. If Memory Register 2 104 has been loaded, then the data is forwarded through MUX 22 166 to FP Copy Unit 168. The FP Copy Unit 168 performs the requested operation on the single operand. The result is passed through MUX 8 66 to the Defer Register 1 76 during MEMORY stage 16, from Defer Register 1 76 through MUX 10 78 to Write Register 1 154 during DEFER stage 17, from Write Register 1 154 to FP Defer Register 1 158 during WRITE stage 18, and from FP Defer Register 1 158 through MUX 20 162 to the FP Register File 26 during FP WRITE stage 20. Similarly, if Memory Register 3 130 has been loaded, then the data is forwarded through MUX 22 166 to FP Copy Unit 168. The FP Copy Unit 168 performs the requested operation on the single operand. The result is passed through MUX 13 134 to the Defer Register 2 142 during MEMORY stage 16, from Defer Register 2 142 to Write Register 2 146 during DEFER stage 17, from Write Register 2 146 to FP Defer Register 2 150 during WRITE stage 18, and from FP Defer Register 2 150 through MUX 21 164 to the FP Register File 26 during FP WRITE stage 20.

H. Data Path For Load Floating Point Instructions

Referring to the bold lined data path 208 of FIG. 3B, when the instruction being processed by the instruction pipeline is a LOAD floating point instruction (i.e., a load of a register in the FP Register File 26 with floating point data from the data cache), operand generation processing is generally the same as for a fixed point arithmetic instruction. The address and register information are immediate operands obtained from the instruction over Line 34 and the line for operand 2 (not shown).

During DECODE stage 14, the operands are determined as explained above. During EXECUTE stage 15, the IU ALU calculates the address in the data cache of the floating point data to be loaded. The address is forwarded to the data cache over a path which is not shown in FIG. 3. During MEMORY stage 16, the Load Aligner 43 accepts either a single word of 32 bits of floating point data or a double word of 64 bits of floating point data, addressed by the address calculated by the IU ALU from the data cache, over Line 41 and forwards the floating point data over Lines 86 and 170. If FP operand 2 consists of a single 32-bit word, then either bits 0–31 or 32–63 are used, depending on the register number of the register being used. Bits 0–31 of the floating point data are transferred over Line 86 to MUX 8 66. Bits 32–63 of the floating point data are transferred over Line 170 to MUX 13 134. Bits 0–31 of the data are then stored in Defer Register 1 76. During DEFER stage 17, bits 0–31 of the data are transferred via MUX 10 78 to Write Register 1 154. During WRITE stage 18, bits 0–31 of the data are forwarded to FP Defer Register 1 158. Finally, during FP WRITE stage 20, bits 0–31 of the data are forwarded to MUX 20 162 and then written to the FP Register File 26. Similarly, Bits 32–63 of the data are stored in Defer Register 2 142. During DEFER stage 17, bits 32–63 of the data are transferred to Write Register 2 146. During WRITE stage 18, bits 32–63 of the data are forwarded to FP Defer Register 2 150. Finally, during FP WRITE stage 20, bits 32–63 of the data are forwarded to MUX 21 164 and then written to the FP Register File 26.

I. Data Path For Store Floating Point Instructions

Referring to the bold lined data path 209 of FIG. 3B, when the instruction being processed by the instruction pipeline is a STORE floating point instruction (i.e., storing floating point data from a register in the FP Register File 26 to a memory location in the data cache), operand generation processing is generally the same as for a floating point arithmetic instruction. Hence, IU ALU 50 calculates the address, using operands 1 and 2. The address and register information are immediate operands obtained from the instruction over Line 34 and the line for operand 2 (not shown). The store data is operand 3 in the instruction, but is formed in the data path of the FP operand 2 path using MUX 14 114, MUX 16 118, MUX 15 116, MUX 17 120, MUX 12 108, MUX 18 122, MUX 11 98, MUX 19 124, and so on. The floating point data is obtained from the FP Register File.

During DECODE stage 14, the operands are determined as explained above. During EXECUTE stage 15, the IU ALU calculates the address in the data cache of the floating point data to be stored. The data is received from a selected register in the FP Register File 26 over Lines 136 and 138. The floating point data may be consist of a single word having 32 bits or a double word having 64 bits. Bits 0–31 of the floating point data are forwarded through MUX 14 114, MUX 15 116, MUX 12 108, MUX 11 98, over Lines 100 and 102, and stored into Memory Register 2 104. Bits 32–63 of the floating point data are forwarded through MUX 16 118, MUX 17 120, MUX 18 122, MUX 19 124, over Lines 126 and 128, and stored in Memory Register 3 130. During MEMORY stage 16, bits 0–31 of the data are forwarded from Memory Register 2 104 through MUX 7 62 to Store Aligner 90 over Line 70. Store Aligner 90 performs the inverse operation of Load Aligner 43. It aligns the floating point data according to the requirements of the data cache. Bits 32–63 of the data are forwarded from Memory Register 3 130 to Store Aligner 90 over Line 172. During the DEFER stage 17, bits 0–31 of the data are stored in Store Data Register 1 92 and bits 32–63 of the data are stored in Store Data Register 2 174. Once the data is in the Store Data Registers, it remains there until either the data cache is available or a subsequent store (and its data) arrives.

SUMMARY

While various embodiments of the invention have been particularly shown, it will be understood by those skilled in the art that the various changes in form and detail may be made without departing from the scope and spirit of the present invention, as defined in the following claims.

It can be seen from the foregoing descriptions the integer and floating point data paths are shared at several locations within the instruction pipeline. One example of the shared data path occurs where integer paths 201, 202 and 204 overlap with floating point paths 207, 208 while passing through MUX 8 66, Defer Register 1 76 and MUX 10 78. Another such example occurs where the integer path 205 overlaps with floating point paths 206 and 209 while passing through MUX 11 98 and path 100.

What is claimed is:

1. A processor for concurrently processing instructions in a single instruction pipeline, the single instruction pipeline having a plurality of successive processing stages, and the instructions including integer instructions for performing integer operations intermixed with floating point instructions for performing floating point operations, the single instruction Pipeline comprising:

a floating point unit (22) to execute floating point instructions of the instruction pipeline (11) and produce a floating point result from at least one floating point operand;

an integer unit (27) to execute integer instructions and produce an integer result from at least one integer operand;

a floating point controller (28) to control synchronization and completion of floating point instructions by the floating point unit, and means shared by the floating point unit (22), the integer unit (27) and floating point controller (28) for communicating therebetween integer operands, integer results, floating point operands, and floating point results during processing of successive stages of the instruction pipeline (11).

2. The processor of claim 1, further comprising:

a first register file (21) coupled to the communicating means to store the integer results formed by the integer unit (27).

3. The processor of claim 2, further comprising:

a second register file (26) coupled to the communicating means to store the floating point results formed by the floating point unit (22).

4. The processor of claim 1, wherein the floating point unit comprises:

a floating point arithmetic logic unit (23) to perform addition, substraction and conversion operations on the floating point operands resulting from the floating point instructions.

5. The processor of claim 1, wherein the floating point unit comprises:

a floating point multiplier unit (24) to perform multiplication operations on the floating point operands resulting from the floating point instructions.

6. The processor of claim 1, wherein the floating point unit comprises:

a floating point division and square root unit (25) to perform division and square root operations on the floating point operands resulting from the floating point instructions.

7. The processor of claim 1, wherein the communicating means is integral with the integer unit (27) and the floating point controller (28).

8. The processor of claim 1, wherein the integer unit comprises:

means (12) for issuing an instruction address for the integer instructions and the floating point instructions.

9. The processor of claim 1, wherein the integer unit comprises:

means (13) for fetching the integer instructions and the floating point instructions.

10. The processor of claim 1, wherein the integer unit comprises:

means (14) for decoding the integer instructions to produce at least one of the integer operands.

11. The processor of claim 1, wherein the integer unit comprises:

means (15) for executing integer operations on the integer operands resulting from the integer instructions and for dispatching floating point instructions and the floating point operands to the floating point unit.

12. The processor of claim 1, further comprising:

means (16) for storing results of execution of the integer instructions.

13. The processor of claim 2, further comprising:

means (17) for canceling storage of the integer results to the first register file (21).

14. The processor of claim 2, further comprising:

means (18) for the writing integer results to the first register file (21).

15. The processor of claim 3, wherein the floating point controller comprises:

means (19) for synchronizing completion of execution of the floating point instructions by the floating point unit (22); and;

means (20) for writing the floating point results to the second register file (26).

16. The processor of claim 1, wherein the communicating means comprises:

first data path means (201) for communicating integer operands and integer results of integer arithmetic and logical instructions.

17. The processor of claim 1, wherein the communicating means comprises:

second data path means (202) for communicating the integer operands and integer results of load integer instructions.

18. The processor of claim 1, wherein the communicating means comprises:

third data path means (203) for communicating the integer operands and the integer results of store integer instructions.

19. The processor of claim 1, wherein the communicating means comprises:

fourth data path (204) means for communicating the integer operands and the integer results from such stages to earlier such stages of the instruction pipeline.

20. The processor of claim 1, wherein the communicating means comprises:

fifth data path means (205) for communicating the integer operands and the integer results of integer multiplication and division instructions.

21. The processor of claim 1, wherein the communicating means comprises:

sixth data path (206) means for communicating at least one of said floating point operands and said floating point results of single operand floating point instructions.

22. The processor of claim 1, wherein the communicating means comprises:

seventh data path means (207) for communicating at least two said floating point operands and the floating point results of double operand floating point instructions.

23. The processor of claim 1, wherein the communicating means comprises:

eighth data path means (208) for communicating the floating point operands and the floating point results of load floating point instructions.

24. The processor of claim 1, wherein the communicating means comprises:

ninth data path means (209) for communicating the floating point operands and floating point results of store floating point instructions.

25. The processor of claim 1, wherein the means shared for communicating for communicating comprises a memory stage, a defer stage and a write stage.

26. A single instruction pipeline processor for concurrently processing instructions, the instructions including integer instructions for performing integer operations intermixed with floating point instructions for performing floating point operations, the single instruction pipeline processor including an integer unit and a floating point unit and a shared data path, the shared data path comprising:

first register means (44, 48) for receiving integer operands;

an arithmetic logic unit (50) to perform arithmetic and logical operations on the integer operands obtained from the first register means thereby generating an integer result;

second register means (56) for receiving the integer result;

first bypass means (70, 80, 82, 72, 74, 60, 38) for transferring the integer result to the first register means;

third register means (76, 142) for receiving the integer result from the second register means and for receiving floating point operands;

a first register file (21) to store the integer result;

means (78, 80) for transferring the integer result from the third register means to the first register file; and a floating point unit (22) to perform arithmetic operations on the floating point operands obtained from the third register means (76) thereby generating a floating point result.

27. The shared data path of claim 26, further comprising:

load aligning means (43) coupled to the third register means for accepting integer data, aligning the integer data into the integer result, and storing the integer result in the third register means.

28. The shared data path of claim 26, further comprising:

means (88, 54) for transferring integer operands from the first register file to the second register means;

store aligning means (90) coupled to the second register means for receiving the integer operands and aligning the integer operands into the integer result;

fourth register means (92, 174) for receiving the integer result; and means (94, 176) for transferring the integer result from the fourth register means to the first register file.

29. The shared data path of claim 26, further comprising:

fifth register means (104, 130) for receiving the integer result from execution of a integer multiply or divide instruction or the floating point result from execution of a floating point copy instruction;

second bypass means (96, 98, 102, 124, 128) for transferring the integer result, integer operand, floating point operands or a floating point result from the second register means to the fifth register means; and third bypass means (106, 108, 122, 144) for transferring the integer result, floating point operands or the floating point result from the third register means to the second bypass means.

30. The shared data path of claim 29, further comprising:

means (96, 98, 100, 106, 108) for transferring integer operands to the floating point unit;

means (110, 112) for receiving the integer result from the floating point unit; and means (114, 116, 118, 120) for transferring the integer result to the third bypass means.

31. The shared data path of claim 30, further comprising:

a second register file (26) to store floating point operands and the floating point result;

means (136, 138, 100, 126) for receiving floating point operands from the second register file, for transferring the floating point operands to the floating point unit, and for transferring the floating point operands to the fifth register means;

means (110, 112) for receiving the floating point result from the floating point unit and transferring the floating point result to the fifth register means;

sixth register means (146, 154) for receiving the floating point result from the third register means and for receiving the floating point operands from third register means;

fourth bypass means (116, 120) for transferring the floating point operands or the floating point result from the sixth register means to the third bypass means;

seventh register means (150, 158) for receiving the floating point result from the sixth register means;

fifth bypass means (152, 160) for transferring the floating point operands or the floating point result from the seventh register means to the fourth bypass means; and means (162, 164) for receiving the floating point result from the seventh register means or from the floating point unit and for storing the floating point result in the second register file.

32. The shared data path of claim 31, further comprising:

a floating point copy unit (168) coupled to the third register means and the fifth register means.

33. A method of communicating intermixed integer operands, integer results, floating point operands and floating point results between an integer unit, a floating point unit, and a floating point controller over a shared data path in a single instruction pipeline processor comprising the steps of:

issuing instructions in the single instruction pipeline processor for execution, the instructions being either an integer instruction or a floating point instruction, integer instructions including integer multiplication and division instructions, floating point instructions including floating point copy instructions, to the integer unit when the instruction is a floating point copy instruction or an integer instruction that is not an integer multiplication or division instruction, or to the floating point unit when the instruction is an integer multiplication or division instruction or a floating point instruction that is not a floating point copy instruction;

receiving the integer operands over the shared data path when the instruction is an integer multiplication or division instruction;

receiving the floating point operands over the shared data path when the instruction is a floating point instruction;

executing the issued instruction by the integer unit when the issued instruction is an integer instruction to form an integer result or when the issued instruction is a floating point copy instruction to form a floating point result;

executing the issued instruction by the floating point unit when the issued instruction is a floating point instruction to form the floating point result or when the issued instruction is an integer multiplication or division instruction to form the integer result; and selectively communicating the integer result and the floating point result over the shared data path.

34. A processor for concurrently processing instructions in a single instruction pipeline, the single instruction pipeline having a plurality of successive processing stages, and the instructions including integer instructions for performing integer operations intermixed with floating point instructions for performing floating point operations, the single instruction pipeline comprising:

a floating point unit (22) to execute floating point instructions of the instruction pipeline (11) and produce a floating point result from at least one floating point operand;

an integer unit (27) to execute integer instructions and produce an integer result from at least one integer operand;

a floating point controller (28) to control synchronization and completion of floating point instructions by the floating point unit, and means shared by the floating point unit (22), the integer unit (27) and floating point controller (28) for communicating therebetween integer operands, integer results, floating point operands, and floating point results during processing of successive stages of the instruction pipeline (11), the means shared for communicating comprising:

first data path means (201) for communicating integer operands and integer results of integer arithmetic and logical instructions, second data path means (202) for communicating the integer operands and integer results of load integer instructions, third data path means (203) for communicating the integer operands and the integer results of store integer instructions, fourth data path (204) means for communicating the integer operands and the integer results from such stages to earlier such stages of the instruction pipeline, fifth data path means (205) for communicating the integer operands and the integer results of integer multiplication and division instructions, sixth data path (206) means for communicating at least one of said floating point operands and said floating point results of single operand floating point instructions, seventh data path means (207) for communicating at least two said floating point operands and the floating point results of double operand floating point instructions, eighth data path means (208) for communicating the floating point operands and the floating point results of load floating point instructions, and ninth data path means (209) for communicating the floating point operands and floating point results of store floating point instructions.

\* \* \* \* \*